(12) United States Patent
Ding et al.

(10) Patent No.: US 7,480,618 B2
(45) Date of Patent: Jan. 20, 2009

(54) ELIMINATING INTERFERENCE OF NOISY MODALITY IN A MULTIMODAL APPLICATION

(75) Inventors: Zhan Ding, Shoreline, WA (US); David K. Burton, Sammamish, WA (US); Yun-Cheng Ju, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 629 days.

(21) Appl. No.: 10/933,146

(22) Filed: Sep. 2, 2004

(65) Prior Publication Data

US 2006/0047509 A1    Mar. 2, 2006

(51) Int. Cl.
G09G 5/00 (2006.01)
G06F 3/042 (2006.01)
G10L 11/00 (2006.01)
G10L 21/00 (2006.01)

(52) U.S. Cl. .................. 704/270; 345/168; 345/175
(58) Field of Classification Search .................. 704/270; 345/168, 175
See application file for complete search history.

(56) References Cited

U.S. PATENT DOCUMENTS

2004/0025115 A1* 2/2004 Sienel et al. ................ 715/513

2005/0278467 A1* 12/2005 Gupta et al. ................... 710/65

OTHER PUBLICATIONS

U.S. Appl. No. 10/881,685, filed Jun. 30, 2004, Yun-Cheng Ju et al.
VoiceGenie and VoxSurf Announce Speech-Driven Multi-Channel Communication Solution, press release, Sep. 16, 2002.
Intervoice, Omvia™ Speech Call Flow Components, Product Capabilities Review, Jul. 17, 2003.
XML Journal, VoiceXML 2.0 and Speech Recognition Grammar Published as W3C Recommendations, Mar. 17, 2004, http://www.sys-con.com.
"Fujitsu Call Center System CCRM-1 Product Description" Fujitsu Call Center System CCRM-1—Product Description, Fujitsu, Sep. 2002.
"Voice Dialer 364 Data Book", Interactive Speech, Sensory Voice Activation, Sensory, Inc. P/N 80-0174-4, 2000.
MacLoed, R., "Linking the New Network to the PSTN Call Management Features on the Brooktrout TR 1000", Brooktrout Technology, Jun. 2000.

* cited by examiner

Primary Examiner—David R Hudspeth
Assistant Examiner—Justin W Rider
(74) Attorney, Agent, or Firm—Westman, Champlin & Kelly, P.A.

(57) ABSTRACT

Aspects of the present invention provide for ranking various input modalities relative to each other and processing recognition results received through these input modalities based in part on the ranking.

8 Claims, 5 Drawing Sheets

ELIMINATING INTERFERENCE OF NOISY MODALITY IN A MULTIMODAL APPLICATION

BACKGROUND OF THE INVENTION

The present invention relates to access of information on a computing device. More particularly, the present invention relates to allowing the computer user to enter information, for example, in response to a single prompt using any one of a number of techniques such as through speech recognition, through a keypad generating DTMF tones (dual tone multi-frequency), or through handwriting recognition to name just a few.

Small computing devices such as personal information managers (PIM), devices and portable phones are used with ever increasing frequency by people in their day-to-day activities. With the increase in processing power now available for microprocessors used to run these devices, the functionality of these devices are increasing, and in some cases, merging. For instance, many portable phones now can be used to access and browse the Internet as well as can be used to store personal information such as addresses, phone numbers and the like. Unfortunately, due to the desire to keep these devices as small as possible in order that they are easily carried, conventional keyboards having all the letters of the alphabet as isolated buttons are usually not possible due to the limited surface area available on the housing or the computing device.

One solution has been to allow the user to enter information through audible phrases and perform speech recognition. In one particular embodiment, speech recognition is used in conjunction with a display. In this embodiment, a user can complete a form or otherwise provide information by indicating the fields on the display that subsequent spoken words are directed to. Specifically, in this mode of data entry, the user is generally under control of when to select a field and provide corresponding information. After selecting a field, the user provides input for the field as speech. This form of entry using both a screen display and allowing free form selection of fields and voice recognition is called "multimodal".

Although speech recognition is quite useful, there arise situations where a user may not want to audibly provide the information. For instance, the content of the information could be confidential, and the user can be in a public environment, where he/she does not wish such information to be overheard. Similarly, if the user is in a noisy environment, errors in speech recognition can easily occur due to background interference. In such situations, it is desirable to allow the user to easily switch between the mode of input. For instance, a user may in such cases prefer to respond via a keyboard or other input device rather than providing spoken commands or phrases.

In addition to the handheld computing devices discussed above, it is also quite common to access information using a simple telephone. In this environment, the user can either provide spoken language or actuate the telephone keypad to generate DTMF tones in response typically to audible prompts rendered through the telephone speaker. Again, this allows the user to choose an input modality that is best suited for the sensitivity of the information provided, and/or the environment in which the information is being provided.

It is also well known that other forms of input modality exist such as handwriting recognition, eye movement to selected areas on a display, gesture and interpretation of other visual responses by a user, to name just a few. Allowing a computer user to use any one of these input modalities at any point in the application improves usability by providing flexibility.

Frameworks have been developed to allow application developers to use different input modalities in an application. Speech Application Language Tags (SALT) is a set of extensions to existing markup languages, particularly HTML and XHTML, that enable multi-modal and/or telephone based systems to access information, applications and/or web services from personal computers, telephones, tablet personal computers and wireless devices. When used in conjunction with a dialog managing mechanism such as Microsoft Speech Server by Microsoft Corporation of Redmond, Wash., an application developer can allow the user to freely select a method of input such as via speech or the use of DTMF generated tones.

Although allowing a computer user to easily select an input modality for any given response improves flexibility, problems still arise. In particular, since it is desirable to allow the user to select the input modality by merely providing speech or depressing a keypad to generate a DTMF tone, the dialog managing mechanism must be prepared to accept input using either modalities. When embodied using SALT techniques, this is accomplished by activating "listen" objects simultaneously for both speech recognition and DTMF recognition. A significant problem arises when, the user has begun depressing keys and a noisy event also occurs in the background. In this situation, the speech recognition mechanism may process what has been heard from the noisy environment and may return a "non-recognition" event, rather than process the input from the DTMF generated tones. Issuance of the non-recognition event coincides with canceling of both the speech recognition and DTMF listen objects.

The application upon receiving the non-recognition event may then prompt the user to speak louder or repeat their verbal instructions. Since the user was in fact trying to enter information using DTMF generated tones through a keypad, the user may be quite confused by these instructions. In addition to possibly confusing the user, the application and the user are now out of sync and the application and the user must come into agreement to enable further processing. Invariably this will take some time.

The present invention provides solutions to one or more of the above-described problems and/or provides other advantages over the prior art.

SUMMARY OF THE INVENTION

Aspects of the present invention provide for ranking various input modalities relative to each other and processing recognition results received through these input modalities based in part on the ranking. In a first method, when input is expected from the user, all modalities are activated such as by activating corresponding objects. On an indication of a higher ranked modality being used by the user, mechanisms used by lower ranked modalities are deactivated so as to avoid receiving results through these modalities, which are considered not to be intended by the user.

In a second method, again when input is expected from the user, all modalities are activated. Each modality is allowed to complete any recognition processing based on the input received through the modality. The recognition result from the highest ranked input modality that has provided an indication that a result has been obtained is then selected to be used.

In a third method, again when input is expected from the user, all modalities are activated and, each modality is allowed to complete any recognition processing based on the input received through the modality. A weighting mechanism or algorithm is then used to ascertain which recognition result will be used. Such weighting mechanism could include statistical weighting factors obtained from experience with each of the input modalities. In addition, confidence measures associated with each recognition result can also be considered with the weighting factors.

Treating recognition results differently based on reliability of the input modality can minimize unexpected actions taken by an application, which improves execution of the application and minimizes frustrations of the user.

DETAILED DESCRIPTION OF ILLUSTRATIVE EMBODIMENTS

Various aspects of the present invention pertain to ranking input modalities that a computer user might use to provide information relative to each other, and processing input from the user with respect to the relative rankings. Examples of well-known computing systems, environments and/or configurations that may be suitable for use with the invention include, but are not limited to personal computers, server computers, hand-held or laptop devices, microprocessor base systems, set-top boxes, programmable dialing applications, to name just a few. Embodiments of the present invention can be implemented in any form of application that allows multiple input modalities in response to a prompt from the computing device, or otherwise allows the user to provide instructions to the computing device. For example, embodiments can be implemented and associated with any number of applications that allows a user to interact over a telephone via speech or DTMF recognition. Such applications include those that render travel directions, e-mails, movie locations, bank account information, etc. to the user. Accordingly, in view of the wide diversity of applications that the present invention can be embodied in, the description provided herein will treat applications generally without specific mention of any particular application unless otherwise noted.

Prior to discussing embodiments of the present invention in detail, an exemplary computing environment within which the embodiments and their associated systems can be implemented will be discussed.

Figure 1:
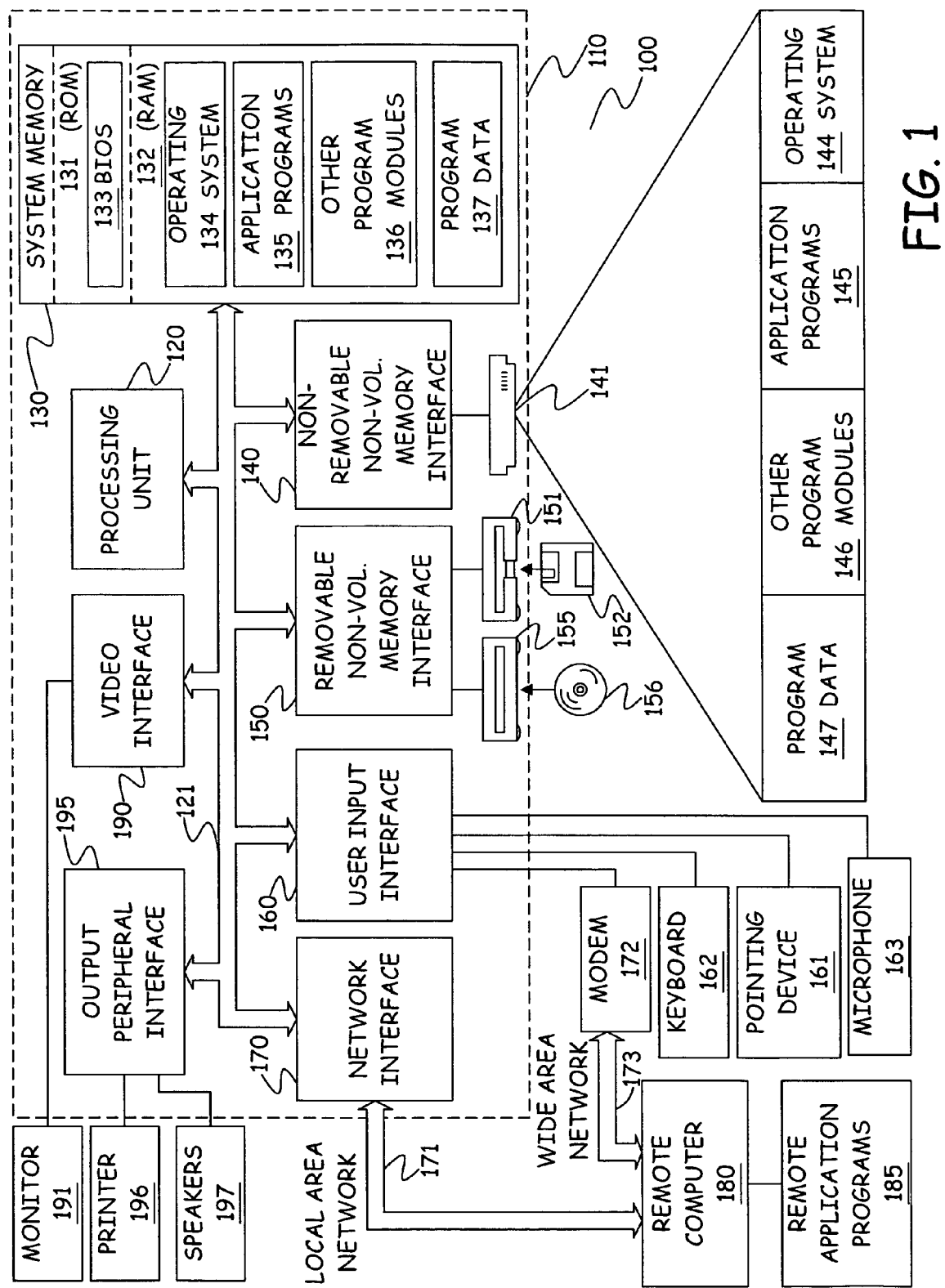
FIG. 1 is a block diagram of one computing environment in which the present invention may be practiced.

FIG. 1 illustrates an example of a suitable computing environment 100 within which embodiments of the present invention and their associated systems may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of illustrated components.

The present invention is operational with numerous other general purpose or special purpose computing consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. Tasks performed by the programs and modules are described below and with the aid of figures. Those skilled in the art can implement the description and figures as processor executable instructions, which can be written on any form of a computer readable media.

The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163 (which also represents a telephone), and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Figure 2:
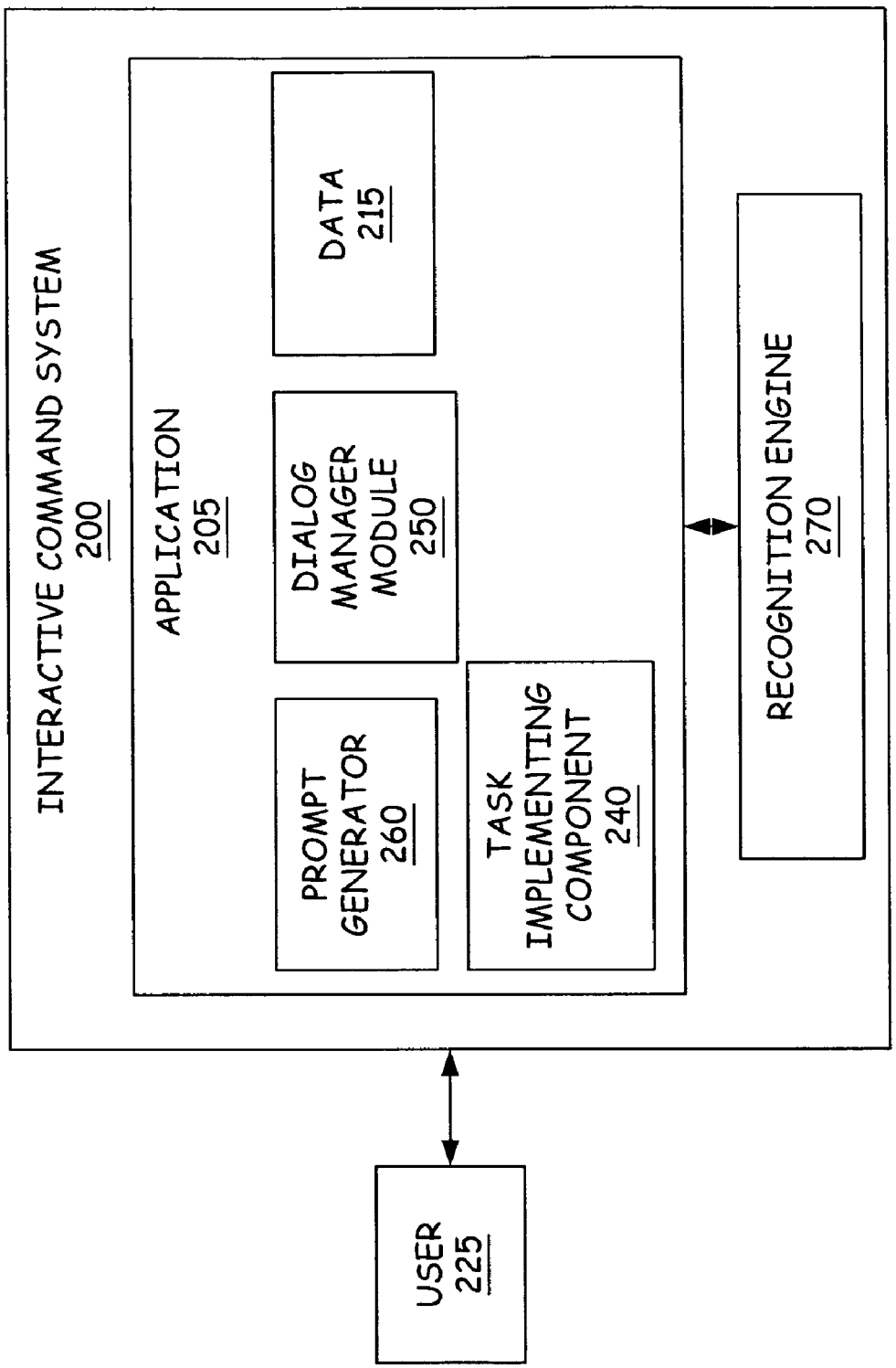
FIG. 2 is a block diagram of a generic system for embodying the present invention.

FIG. 2 is a schematic block diagram of a general interactive command system 200 in accordance with an example embodiment of the present invention. System 200 is accessible by a user 225 to implement a task. System 200 includes an application 205 having access to data 215. For example, the data 215 can include e-mail messages of user 225, data indicative of obtaining travel directions, data indicative of movie locations, data indicative of bank account information or data indicative of a list of employees in a call routing application. It is intended that the embodiment of FIG. 2 to be representative of any general application and the foregoing examples should not be considered limiting.

Application 205 includes or is operable with a dialog managing module 250 that manages the dialog with the user 225. The dialog managing module 250 operates with a prompt generating module 260 and one or more recognition engines 270 (e.g. voice, DTMF, handwriting, gesture, computer vision, etc.). The dialog manager module 250 in accordance with application 205 generates suitable prompts (e.g. voice, visual, etc.) to user 225. The user can use any form of input modality for providing a response or otherwise provide instructions acted upon by dialog manager module 250.

Dialog manager module 250 can be implemented with well-known mechanisms such as SALT or Voice XML. It should also be noted that application 205, data 215, dialog module manager 250, voice generator module 260 and recognition module 270 need not be necessarily be implemented within the same computing environment. For example, application 205 as associated with data 215 could be operated from a first computing device that is in communication via network with a different computing device operating recognition module 270 and its associated grammar (not shown). These and other distributed implementations are within the scope of the present invention. Furthermore, the modules described herein and the functions they perform can be combined or separated in other configurations as appreciated by those skilled in the art.

As indicated above, dialog manager module 250 interacts with user 225 and receives therefrom through suitable input devices such as a telephone, keypad, microphone, camera, pointing device or the like, as exemplified by the embodiment of FIG. 1, responses from the user or other instructions. Typically, after providing a prompt, the dialog manager module 250 will activate objects or provide other mechanisms to receive input in accordance with allowed input modalities. For example and without limitation, a DTMF object and a voice recognition object can be activated to receive DTMF generated tones and voice recognition, respectively, in accordance with SALT. However, in order to avoid the problems discussed in the background section, the input modalities are not treated the same as it pertains to reliability of the information received from the user through the input modality.

Figure 3:
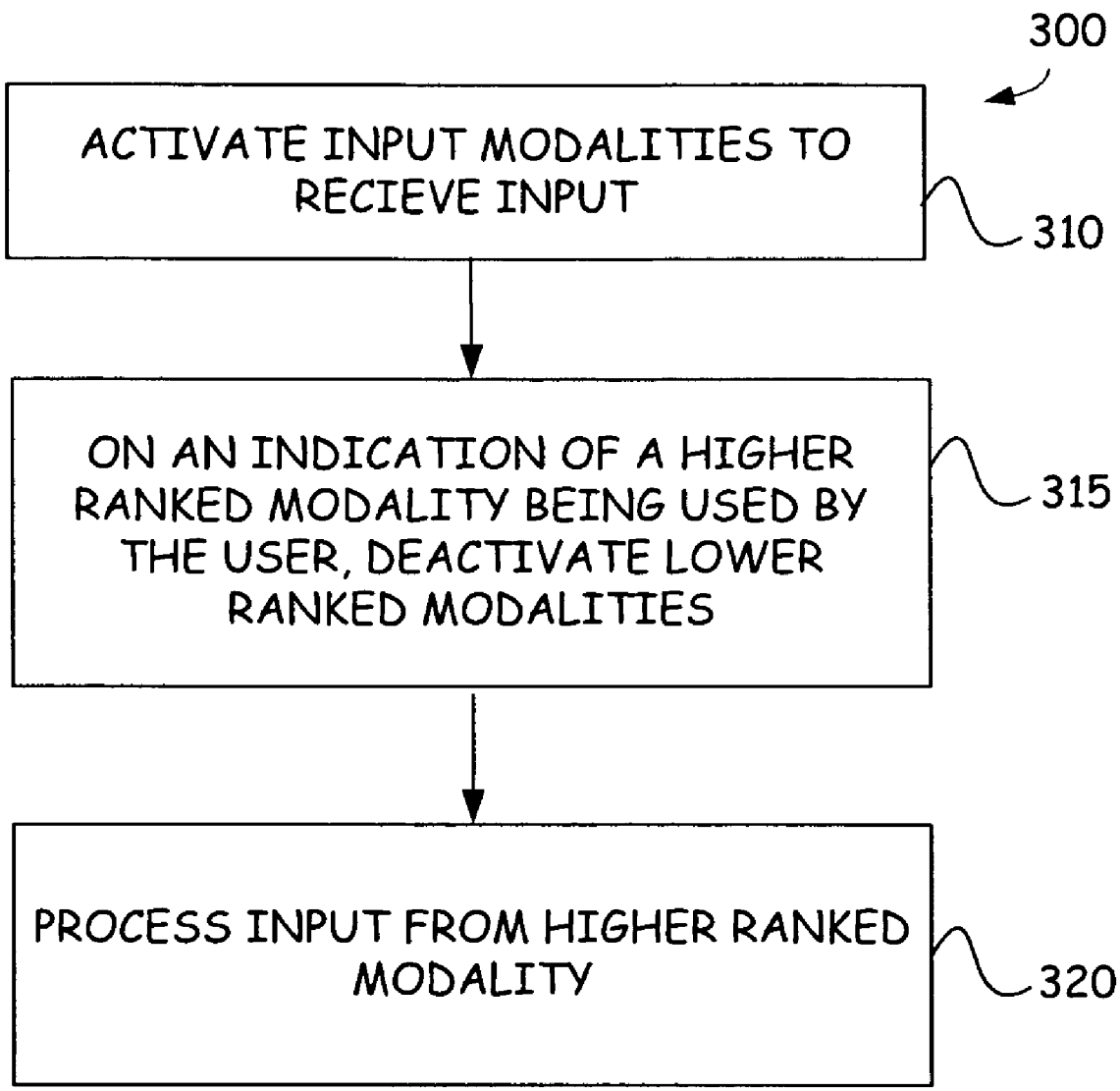
FIG. 3 is a flow diagram of a first method of processing inputs from multiple modalities.

FIG. 3 illustrates a first method 300 for processing information received through multiple modalities. At step 310, when input is expected from the user, all modalities are activating such as by activating corresponding objects as discussed above. It should be noted that in this embodiment, input modalities are qualitatively ranked relative to each other such that there exists at least one modality that is considered more reliable than others. In a further embodiment, each modality is given a unique relative ranking. For instance, in a system that accepts input through DTMF generation, voice recognition or computer vision recognition, the input modality using DTMF tones could be considered the highest in terms of reliability, whereas voice recognition and computer vision are ranked second and third in terms of relative reliability, respectively. At step 315, on an indication of a higher ranked modality being used by the user, mechanisms used by lower ranked modalities are deactivated so as to avoid receiving results through these modalities, which are considered not to be intended by the user. In the example above where DTMF tones, voice recognition and computer vision recognition are activated at step 310, if upon actuation by a user of a keypad to generate a DTMF tone, recognition of the DTMF tone can initiate an event or otherwise indicate that a tone has been received. This event will in turn cause dialog manager module 250 and/or the recognition module 270 to deactivate any processing related to voice recognition or computer vision recognition. In this manner, any background noise for each modality that has been detected by system 200 will not be further processed, where such processing may only realize a non-recognition result which would cause an unexpected action in application 205. Rather, this technique assumes that the activation of the higher reliability modality is what is intended by the user and thus, processing of the result received through the modality (as indicated by step 320) will be in accordance with what the user expects.

Figure 4:
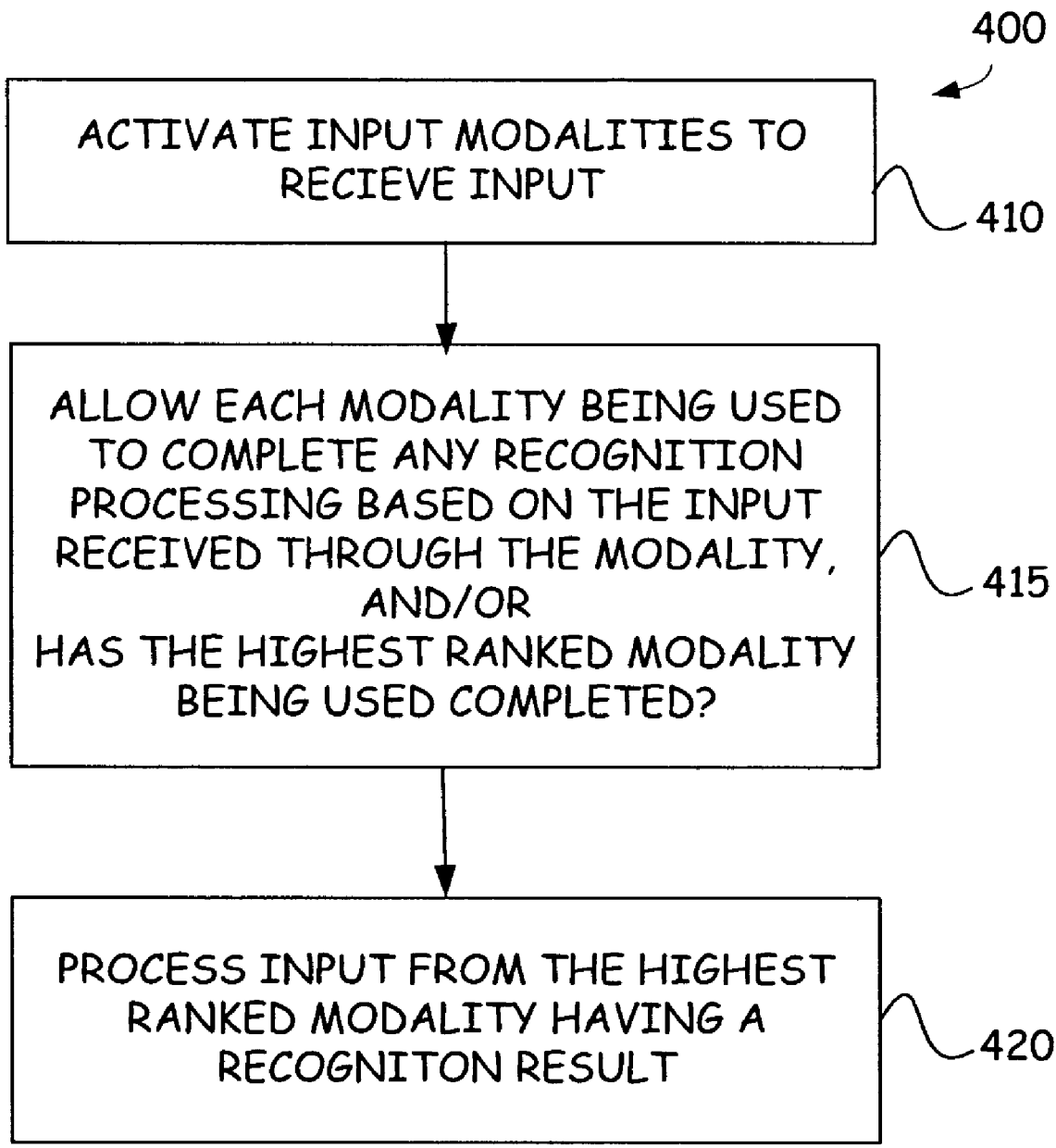
FIG. 4 is a flow diagram of a second method of processing inputs from multiple modalities.

FIG. 4 illustrates an alternative method 400 for processing inputs from a user through multiple modalities. Step 410 is similar to that described above where each modality that is allowable is activated in a manner as described above with respect to step 310.

At step 415, each modality being used is allowed to complete any recognition processing based on the input received through the modality, and/or recognition processing continues until the highest ranked modality has completed. It is noted that recognition processing could lead to a recognition result or an indication that no result has been recognized. The extent that any events are issued based upon recognition processing such as a particular recognition is completed, or no recognition was obtained for a given modality, the dialog manager module 250 does not take any action until step 415 is completed.

At step 420, the dialog manager module 250 uses the recognition result from the highest ranked input modality that has provided an indication that a result has been obtained. In other words, if an input modality comprising DTMF generated tones is considered the highest ranked reliability modality, but there is an indication that no keys have been pressed, while voice recognition indicates that a result has been obtained, dialog manager module 250 will use the result obtained from voice recognition.

Figure 5:
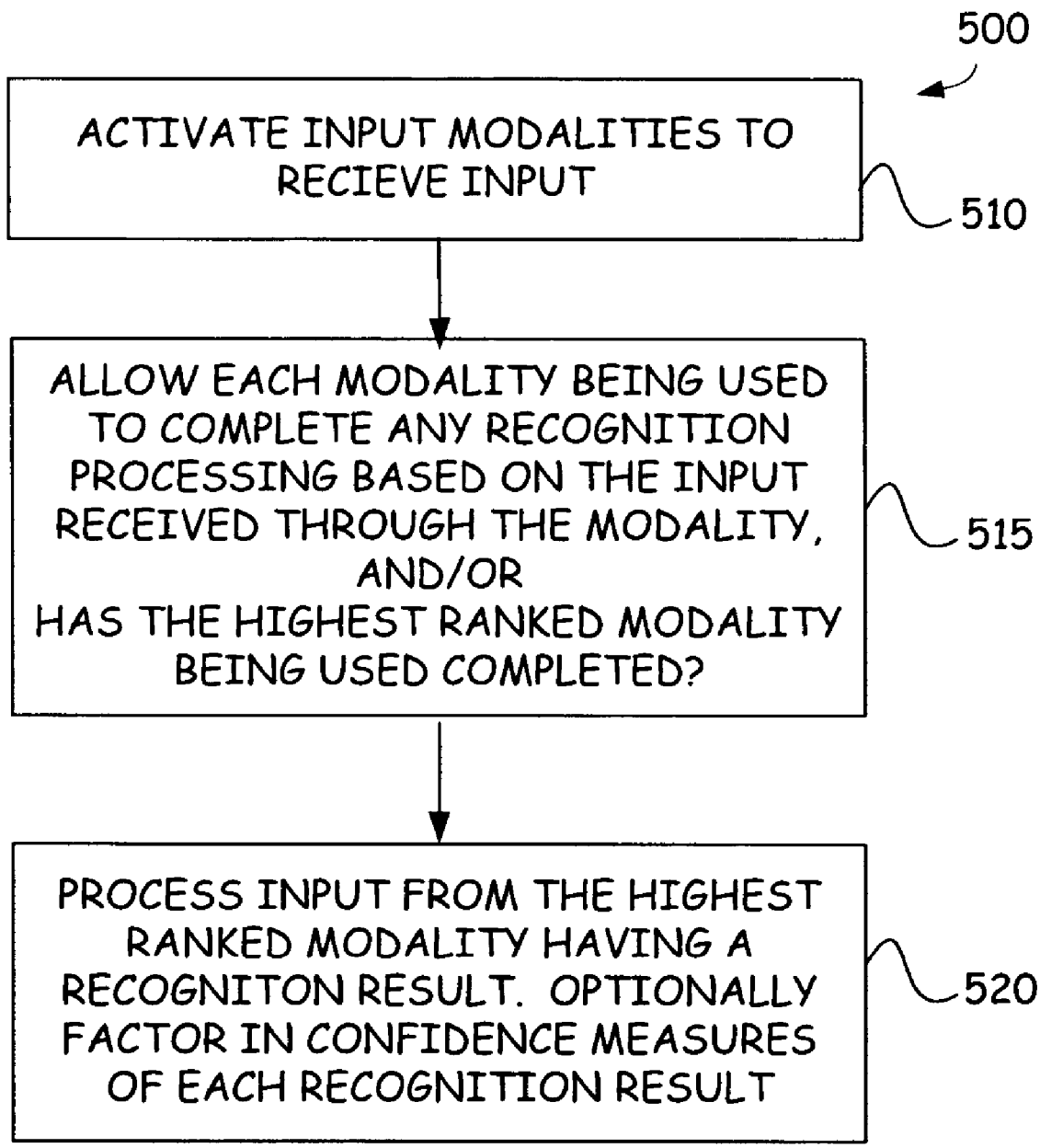
FIG. 5 is a flow diagram of a third method of processing inputs from multiple modalities.

Another embodiment for processing inputs from multiple modalities is illustrated in FIG. 5 at 500. Steps 510 and 515 are identical to that described above with respect to steps 410 and 415, respectively. At step 520, dialog manager module 250 uses a weighting mechanism or algorithm to ascertain which recognition result will be used. Such weighting mechanism could include statistical weighting factors obtained from experience with each of the input modalities. For instance, based on experience, recognition result through voice recognition may be considered more reliable than recognition results obtained from computer vision recognition. These relative weighting factors can be combined with "confidence measures" typically received from recognition modules in order to ascertain which recognition result to use. For example, suppose that voice recognition is considered to be more reliable than computer vision recognition and the voice recognition modality has a corresponding weighing factor indicative of this higher reliability than the computer vision recognition modality. Then, for a given response from the user, which assumes both an audible and visual response, the recognition module 270 associated with computer vision recognition could return a result with an indication of very high confidence, whereas a voice recognition module responding to audible signals occurring at the same time, returns a recognition result with low confidence. Upon applying the relative weighting factors associated with each input modality along with the confidence measure associated with each recognition result obtained for each modality, the dialog manager module 250 may determine that the recognition result obtained from computer vision recognition is the result more likely intended by the user. This recognition result would then be used by the application 205 at step 520.

In summary, aspects of the present invention provide for ranking various input modalities relative to each other and processing recognition results received through these input modalities based in part on the ranking. Treating recognition results differently based on reliability of the input modality can minimize unexpected actions taken by an application, which improves execution of the application and minimizes frustrations of the user.

Although the present invention has been described with reference to particular embodiments, workers skilled in the art will recognize that changes may be made in form and detail without departing from the spirit and scope of the invention.

What is claimed is:

1. A method for processing inputs from a user into a computer, the method comprising:
   ranking input modalities;
   receiving responses from the user pursuant to a plurality of modalities including receiving a confidence measure for each response; and
   processing, via a processing unit, the responses based on the rankings using a weighting factor for each input modality in combination with the associated confidence measure to select a user response to be used.

2. The method of claim 1 wherein processing the responses based on the rankings comprises deactivating lower ranked responses upon indications that a higher ranked input modality is being used by the user.

3. The method of claim 1 wherein processing the responses based on the rankings comprises selecting the response from the highest ranked input modality that has obtained a result.

4. The method of claim 1 wherein the input modalities comprise at least two input modalities from the group: voice recognition, DTMF recognition, computer vision recognition, handwriting recognition, keyboard input and pointing device input.

5. A computer-readable storage medium having instructions that would cause a processor to process inputs from a user into a computer, the instructions comprising:
  i. receiving responses from the user pursuant to a plurality of modalities;
  ii. receiving a confidence measure for each response; and
  iii. processing the responses using a weighting factor for each input modality in combination with the associated confidence to select a user response to be used.

6. The computer readable storage medium of claim 5 wherein processing the responses based on the rankings comprises deactivating lower ranked responses upon indications that a higher ranked input modality is being used by the user.

7. The computer readable storage medium of claim 5 wherein processing the responses based on the rankings comprises selecting the response from the highest ranked input modality that has obtained a result.

8. The computer readable storage medium of claim 5 wherein the input modalities comprise at least two input modalities from the group: voice recognition, DTMF recognition, computer vision recognition, handwriting recognition, keyboard input and pointing device input.

* * * * *